(12) United States Patent
Lee et al.

(10) Patent No.: US 10,769,500 B2
(45) Date of Patent: Sep. 8, 2020

(54) LOCALIZATION-AWARE ACTIVE LEARNING FOR OBJECT DETECTION

(71) Applicant: Mitsubishi Electric Research Laboratories, Inc., Cambridge, MA (US)

(72) Inventors: Teng-Yok Lee, Cambridge, MA (US); Chieh-Chi Kao, Goleta, CA (US); Pradeep Sen, Goleta, CA (US); Ming-Yu Liu, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/691,911

(22) Filed: Aug. 31, 2017

(65) Prior Publication Data
US 2019/0065908 A1   Feb. 28, 2019

(51) Int. Cl.
*G06K 9/62*   (2006.01)
*G06T 7/70*   (2017.01)
(Continued)

(52) U.S. Cl.
CPC ......... *G06K 9/6263* (2013.01); *G06K 9/4604* (2013.01); *G06K 9/6259* (2013.01);
(Continued)

(58) Field of Classification Search
CPC ............. G06K 9/00536; G06K 9/3233; G06K 9/6256; G06K 9/00288; G06K 9/3241;
(Continued)

(56) References Cited

U.S. PATENT DOCUMENTS 6,324,532 B1   11/2001   Spence et al.
9,589,210 B1   3/2017   Estrada et al.
(Continued)

FOREIGN PATENT DOCUMENTS

EP   2672396 A1   12/2013
WO   2014205231   6/2014

OTHER PUBLICATIONS

Alberto Bietti. Active Learning for Object Detection on Satellite Images. Tech. rep. Caltech, Jan. 2012.
(Continued)

*Primary Examiner* — Guillermo M Rivera-Martinez
(74) *Attorney, Agent, or Firm* — Gennadiy Vinokur; James McAleenan; Hironori Tsukamoto

(57) ABSTRACT

System and method for an active learning system including a sensor obtains data from a scene including a set of images having objects. A memory to store active learning data including an object detector trained for detecting objects in images. A processor in communication with the memory, is configured to detect a semantic class and a location of at least one object in an image selected from the set of images using the object detector to produce a detection metric as a combination of an uncertainty of the object detector about the semantic class of the object in the image (classification) and an uncertainty of the object detector about the location of the object in the image (localization). Using an output interface or a display type device, in communication with the processor, to display the image for human labeling when the detection metric is above a threshold.

21 Claims, 9 Drawing Sheets

┌─ 100

┌─ 120
Acquiring a set of images of a scene from a sensor via an input interface by a processor, wherein the set of images includes objects

↓

┌─ 125
Using the processor to input the acquired set of images into an object detector stored in memory

↓

┌─ 130
Based on the object detector, produce a detection metric, as a combination of an uncertainty of the object detector about the semantic class of the object in the image, and an uncertainty of the object detector about the location of the object in the image

↓

┌─ 135
Using an output interface to display the image for human labeling when the detection metric is above a threshold

(51) Int. Cl.
*G06K 9/46* (2006.01)
*G06K 9/72* (2006.01)

(52) U.S. Cl.
CPC ......... *G06K 9/6262* (2013.01); *G06K 9/6264* (2013.01); *G06K 9/6269* (2013.01); *G06K 9/6277* (2013.01); *G06K 9/726* (2013.01); *G06T 7/70* (2017.01)

(58) Field of Classification Search
CPC .............. G06K 9/6269; G06K 9/00147; G06T 2207/20081; G06T 2207/20084; G06T 7/70
See application file for complete search history.

(56) References Cited

U.S. PATENT DOCUMENTS

| | | | |
|---|---|---|---|
| 2014/0201126 A1* | 7/2014 | Zadeh | G06K 9/627 706/52 |
| 2015/0110387 A1* | 4/2015 | Lienhart | G06K 9/6228 382/159 |
| 2015/0170002 A1* | 6/2015 | Szegedy | G06K 9/66 382/156 |
| 2015/0170005 A1* | 6/2015 | Cohen | G06F 16/7328 382/180 |
| 2016/0259975 A1* | 9/2016 | Saptharishi | G06K 9/00771 |
| 2017/0083762 A1* | 3/2017 | Segalovitz | G06K 9/00442 |
| 2018/0114334 A1* | 4/2018 | Desai | G06K 9/6259 |
| 2018/0211396 A1* | 7/2018 | Roshtkhari Javan | G06T 7/248 |
| 2018/0260759 A1* | 9/2018 | Bencke | G06Q 10/063112 |

OTHER PUBLICATIONS

Soumya Roy; Vinay P. Namboodiri; Arijit Biswas. "Active Learning with Version Spaces for Object Detection." (Submitted on Nov. 22, 2016 (v1), last revised Nov. 29, 2016 (this version, v2)). Computer Vision and Pattern Recognition (cs.CV).

Okuma, Kenji, Brochu, Eric, Lowe, David G., and Little, James J. "An adaptive interface for active localization." In International Conference on Computer Vision Theory and Applications, 2011.

Comaschi et al., "A Tool for Fast Ground Truth Generation for Object Detection and Tracking from Video," 2014 IEEE International Conference on Image Processing, IEEE, Oct. 27, 2014. pp. 368-372.

Karasev et al., "Active Frame, Location and Detector Selection for Automated and Manual Video Annotation," 2014 IEEE Conference on Computer Vision and Pattern Recognition, IEEE, Jun. 23, 2014, p. 2131-2138.

* cited by examiner

LOCALIZATION-AWARE ACTIVE LEARNING FOR OBJECT DETECTION

FIELD

The present disclosure relates generally to systems and methods for computer vision, and more particularly to applying active learning for object detection using an object detector that considers both localization and classification of an object in an image.

BACKGROUND

Conventional vision detection approaches have shown that with a large amount of annotated data, convolutional neural networks (CNNs) can be trained to achieve a super-human performance for various visual recognition tasks. However, these conventional vision detection methods have failed to investigate into effective approaches for data annotation, since data annotation is essential and expensive. For example, data annotation is especially expensive for object detection tasks. Compared to annotating image classes, which can be done via a multiple-choice question, annotating object location requires a human annotator to specify a bounding box for an object. Simply dragging a tight bounding box to enclose an object can cost 10-times more time than answering a multiple-choice question. Consequently, a higher pay rate has to be paid to a human labeler for annotating images for an object detection task. In addition to the cost, which is more difficult to monitor and control is the annotation quality.

Accordingly, there is need to achieve better performance with less annotation processes and, hence, less annotation budgets, among other things.

SUMMARY

Embodiments of the present disclosure are directed to providing systems and methods for applying active learning for object detection using an object detector that considers both localization and classification of an object in an image.

The present disclosure is based on the recognition that active learning that uses an uncertainty measure of features of objects in an image of a scene, can be an effective approach for annotating data for an image-classification and an image-localization task. Specifically, our realization is based on using a detection metric for active learning for object detection that includes a combination of an uncertainty of the object detector about a semantic class of an object in the image (classification) and an uncertainty of the object detector about a location of an object in the image (localization). However, coining to this realization required a further understanding through experimentation as to what can serve as a metric of uncertainty for object localization.

Specifically, through experimentation we learned using active learning that it is a machine learning procedure useful in reducing an amount of annotated data required to achieve a target performance specific to the aspects of the present disclosure. That, active learning can be applied to various computer-vision problems including object classification and activity recognition. Further, active learning can be used for initial training for a baseline model (classifier) with a small, labeled dataset, wherein the classifier can be applied to the unlabeled data. Such that, for each unlabeled sample, the active learning can estimate whether this sample contains critical information that has not been learned by the baseline model. Thus, once having identified the samples that bring the most critical information and are labeled by human annotators, they can be added to the initial training dataset to retrain the model. When comparing our method(s) to some conventional passive learning methods, which randomly selects samples from the unlabeled dataset, we discovered that our active learning can achieve the same accuracies as some conventional passive learning methods, however, with fewer but more informative labeled samples which are beneficial for many aspects of the present disclosure.

Our experimentation further led us to understand what can serve as a metric of uncertainty for object localization. We realized that the present disclosure algorithm(s) can be based on two quantitative measurements of the localization uncertainty. The first quantitative measurement of the localization uncertainty, includes a Localization Tightness (LT) metric that can estimate how tight the detected bounding boxes can enclose true objects. For example, the tighter the bounding box, the more certain localization. Localization tightness can be estimated based on an amount of adaptation of the initial bounding box, e.g., proposed by region proposal network (RPN), by an object detector. The second quantitative measurement of the localization uncertainty includes a Localization Stability (LS) metric based on whether the detected bounding boxes are sensitive to changes in the input image. Wherein to evaluate the localization stability, the present disclosure algorithm adds different amounts of Gaussian noise to pixel values of the image, and measures how the detected regions vary with respect to the noise. We note that at least one aspect of the present disclosure is that we realized, given an image, we can manipulate the image by adding a noise and measure hose the bounding box varies. Such that, this metric can be applied to all kinds of object detectors, especially those that do not have an explicit proposal stage. Also, that this metric can be applied to applied to video surveillance analysis, obstacle detection and path planning for autonomous driving, etc.

In other words, the present disclosure can analyze measurements on multiple public benchmarks and different object detectors. Which is unique and has innovative aspects, including being able to present different measurements to quantitatively evaluate the localization uncertainty of an object detector. Further that our measurements consider different aspects of object detection in spite that the ground truth of object locations is unknown, making our measurement suited for active learning. Another unique and innovative aspect includes demonstrating that in order to apply active learning for object detection, both the localization and the classification of a detector should be considered when sampling informative images. For example, the systems and methods of the present disclosure can train a detector on PASCAL 2012 benchmark, by non-limiting example, that achieves the same performance of conventional passive learning approaches, but with significantly less of annotated data. These performance levels can be achieved, by non-limiting example, by extending the method works for the classification with localization tightness (LT) and localization stability (LS), respectively, among other things. In other words, if the object detector models involve the adjustment of bounding box's size and location, we can further estimate the tightness.

To better explain the active learning systems and methods of the present disclosure, we provide some process flow steps for at least one method. For example, the method includes an object detector initially taking an image as input, and outputs a set of rectangular bounding boxes. Wherein each bounding box has a location and a scale of its (bounding box) shape, and a probability mass function of all classes. At least one training process step initially begins with a small training set of annotated images to train a baseline object detector. In order to improve the object detector by training with more images, the method continues to collect more images to annotate. Along with annotating all newly collected images, based on different characteristics of the current detector, we also select a subset of them for human annotators to label. Once having been annotated, these selected images can be added to the training set to train a new detector at some later time. Wherein the entire process can continue to collect more images, select a subset with respect to the new detector, annotate the selected ones with humans, re-train the detector and so on and so on. Wherein, we call such a cycle of data collection, selection, annotation, and training as a single round.

At least one key component of the present disclosure, among many key components, is in the selection step, which selects a set of informative images. The informativeness of an image is quantified as an uncertainty score, which specifies how uncertain a detector is toward its labels including the object class and location. An object in an image is specified as a bounding box. If an object bounding box has a high uncertainty score, then the image should be selected. Regarding computing the score, we consider the uncertainty in both classification and localization. The classification uncertainty of a bounding box can be similar to an active learning approach, which is based on the probability mass function of classes. For example, if the probability on a single class is close to 1.0, i.e. meaning that the probabilities for other classes are low, then, the detector is highly certain about its class. In contrast, when multiple classes have similar probabilities, each probability will be low because the sum of probabilities of all classes must be one. Thus, we can use one minus the maximum value of classes' probability mass function as the classification uncertainty.

Further, given an image, we assign a score based on either the inconsistency between the localization and classification, or the stability of detected object locations. Then the unlabeled image with highest score can be sent to human labelers to select the boxes that contain objects and the corresponding object class. These images with their labels can be used to train the initial object detector to improve its performance. This process can be repeated till the performance of the object detector is satisfied.

According to an embodiment of the present disclosure, an active learning system that includes an input interface for receiving a set of images of a scene from a sensor. For example, the sensor(s) may be a video camera or camera like device, that obtains data from the scene including a set of images. The data may also include environmental data such as environmental conditions such as temperature, and the like. Further, a memory can be utilized to store active learning data that includes an object detector trained for detecting objects in images. A processor(s) in communication with the input interface and the memory, can be configured to detect a semantic class and a location of at least one object in an image selected from the set of images using the object detector to produce a detection metric as a combination of an uncertainty of the object detector about the semantic class of the object in the image (classification) and an uncertainty of the object detector about the location of the object in the image (localization). Finally, using an output interface, i.e. display type device, in communication with the processor, to display the image for human labeling when the detection metric is above a threshold.

According to another embodiment of the present disclosure, an active learning system including a memory that receives imaging data. The imaging data includes sets of images of a scene from a sensor via an input interface. Further, the memory includes a storage device with stored active learning data that includes an object detector trained for detecting objects in images. A processor is configured to connect to the memory, the input interface and an output interface. Wherein the processor executes instructions for producing a detection metric using the object detector. Wherein the object detector performs the steps of detecting a semantic class and a location of at least one object in an image selected from at least one set of images of the sets of images using the object detector to produce a detection metric as a combination of an uncertainty of the object detector about the semantic class of the object in the image and an uncertainty of the object detector about the location of the object in the image. Outputting the image using the output interface to an imaging interface connected to an imaging device, for displaying the image on the imaging device for human labeling when the detection metric is above a threshold.

According to another embodiment of the present disclosure, an active learning method for object detection using an object detector that considers both localization and classification of an object in an image. The method including receiving imaging data that includes sets of images of a scene from a sensor via an input interface and storing the imaging data in a memory. Wherein the memory includes a storage device having stored active learning data that includes an object detector trained for detecting objects in images. Using a processor in communication with the input interface and the memory. The processor is configured for executing instructions for producing a detection metric using the object detector. Wherein the object detector performs the steps of detecting a semantic class and a location of at least one object in an image selected from at least one set of images of the sets of images using the object detector to produce a detection metric as a combination of an uncertainty of the object detector about the semantic class of the object in the image and an uncertainty of the object detector about the location of the object in the image. Outputting the image via an output interface to an imaging device, to display the image for human labeling when the detection metric is above a threshold. Wherein the processor is in communication with the output interface and imaging device.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1A:
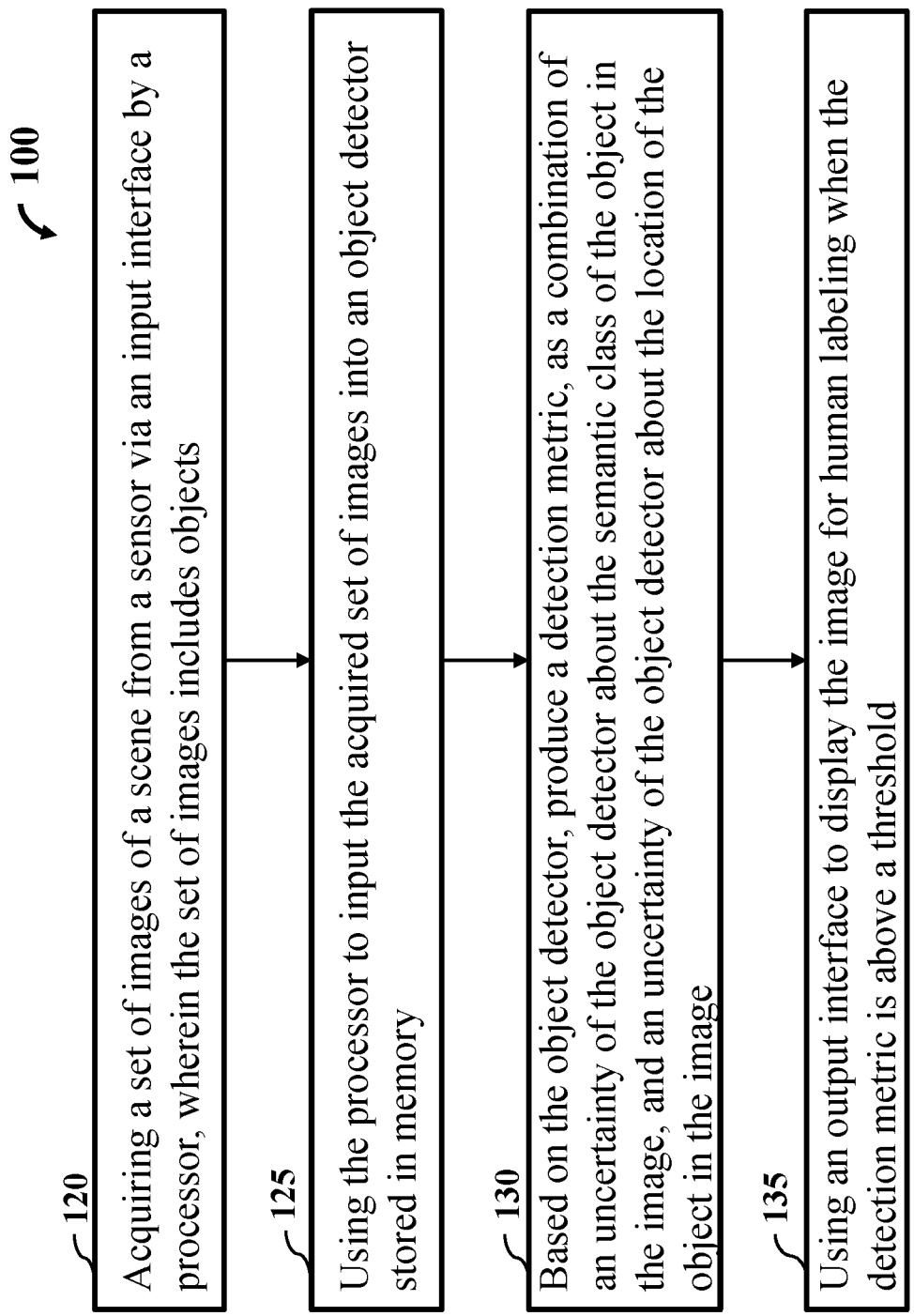
FIG. 1A is a block diagram illustrating an active learning system, according to an embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims of the present disclosure.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of the present disclosure are directed to systems and methods for applying active learning for object detection using an object detector that considers both localization and classification of an object in an image.

The present disclosure is based on the recognition that active learning that uses an uncertainty measure of features of objects in an image of a scene, can be an effective approach for annotating data for an image-classification and an image-localization task. Specifically, our realization is based on using a detection metric for active learning for object detection that includes a combination of an uncertainty of the object detector about a semantic class of an object in the image (classification) and an uncertainty of the object detector about a location of an object in the image (localization). However, coining to this realization required a further understanding through experimentation as to what can serve as a metric of uncertainty for object localization.

Specifically, we know through experimentation that active learning can be used for initial training for a baseline model (classifier) with a small, labeled dataset, wherein the classifier can be applied to the unlabeled data. Such that, for each unlabeled sample, the active learning can estimate whether this sample contains critical information that has not been learned by the baseline model. Thus, once having identified the samples that bring the most critical information and are labeled by human annotators, they can be added to the initial training dataset to retrain the model.

Further still, the active learning features of the present disclosure address the technological needs required to meet the demands of today's technological applications regarding visual feature description for fast inference methods in the context of autonomous driving applications, along with other applications. Specifically, the present disclosure is able to overcome the data of conventional autonomous driving applications/approaches. Because the scenarios of driving is complicated, ideally, the collected data for driving should have enough volume and cover a wide range of driving scenes. However, annotating all driving images can be extremely expensive. Via active learning, we can reduce the numbers of images to label, which is crucial for applications that require a very large scale of labeled images.

We realized through experimentation what can serve as a metric of uncertainty for object localization, that the present disclosure algorithm(s) can be based on two quantitative measurements of the localization uncertainty. The first quantitative measurement of the localization uncertainty, includes a Localization Tightness (LT) metric that can estimate how tight the detected bounding boxes can enclose true objects. For example, the tighter the bounding box, the more certain localization. Localization tightness can be estimated based on an amount of adaptation of the initial bounding box, e.g., proposed by region proposal network (RPN), by an object detector. The second quantitative measurement of the localization uncertainty includes a Localization Stability (LS) metric based on whether the detected bounding boxes are sensitive to changes in the input image. Wherein to evaluate the localization stability, the present disclosure algorithm adds different amounts of Gaussian noise to pixel values of the image, and measures how the detected regions vary with respect to the noise. Such that, this metric can be applied to all kinds of object detectors, especially those that do not have an explicit proposal stage. Also, that this metric can be applied to applied to video surveillance analysis, obstacle detection and path planning for autonomous driving, etc.

In other words, the present disclosure can analyze measurements on multiple public benchmarks and different object detectors. Which is unique and has innovative aspects, including being able to present different measurements to quantitatively evaluate the localization uncertainty of an object detector. Further that our measurements consider different aspects of object detection in spite that the ground truth of object locations is unknown, making our measurement suited for active learning. Another unique and innovative aspect includes demonstrating that in order to apply active learning for object detection, both the localization and the classification of a detector should be considered when sampling informative images. For example, the systems and methods of the present disclosure can train a detector on PASCAL 2012 benchmark, by non-limiting example, that achieves the same performance of conventional passive learning approaches, but with significantly less of annotated data, i.e. by about 15 to about 20%, and about 20 to about 25% less of annotated data. These performance levels can be achieved, by non-limiting example, by extending the method works for the classification with localization tightness (LT) and localization stability (LS), respectively, among other things.

The active learning system for some embodiments of the present disclosure can include a human machine interface, a storage device including neural networks, a memory, a network interface controller connectable with a network being outside the system. The active learning system can further include an imaging interface connectable with an imaging device, a processor configured to connect to the human machine interface, the storage device, the memory, the network interface controller and the imaging interface, wherein the processor can execute instructions for producing a detection metric using the object detector stored in the storage device. The object detector can perform steps that at least include detecting a semantic class and a location of at least one object in an image selected from at least one set of images of the sets of images. Further, the object detector performs the step of using the object detector to produce a detection metric as a combination of an uncertainty of the object detector about the semantic class of the object in the image and an uncertainty of the object detector about the location of the object in the image. Further still, the object detector performs the step of outputting the image to the imaging device, to display the image for human labeling when the detection metric is above a threshold.

To better explain the active learning systems and methods of the present disclosure, we provide some process flow steps for at least one method. For example, the method includes an object detector initially taking an image as input, and outputs a set of rectangular bounding boxes. Wherein each bounding box has a location and a scale of its (bounding box) shape, and a probability mass function of all classes. At least one training process step initially begins with a small training set of annotated images to train a baseline object detector. In order to improve the object detector by training with more images, the method continues to collect more images to annotate. Along with annotating all newly collected images, based on different characteristics of the current detector, we also select a subset of them for human annotators to label. Once having been annotated, these selected images can be added to the training set to train a new detector at some later time. Wherein the entire process can continue to collect more images, select a subset with respect to the new detector, annotate the selected ones with humans, re-train the detector and so on and so on. Wherein, we call such a cycle of data collection, selection, annotation, and training as a single round.

At least one key component of the present disclosure, among many key components, is in the selection step, which selects a set of informative images. The informativeness of an image is quantified as an uncertainty score, which specifies how uncertain a detector is toward its labels including the object class and location. An object in an image is specified as a bounding box. If an object bounding box has a high uncertainty score, then the image should be selected. Regarding computing the score, we consider the uncertainty in both classification and localization. The classification uncertainty of a bounding box can be similar to an active learning approach, which is based on the probability mass function of classes. For example, if the probability on a single class is close to 1.0, i.e. meaning that the probabilities for other classes are low, then the detector is highly certain about its class. In contrast, when multiple classes have similar probabilities, each probability will be low because the sum of probabilities of all classes must be one. Thus, we can use one minus the maximum value of classes' probability mass function as the classification uncertainty.

FIG. 1A is a block diagram illustrating an active learning system, according to an embodiment of the present disclosure. Initially, the active learning system 100 includes the step of acquiring a set of images 120 of a scene from a sensor via an input interface by a processor, wherein the set of images includes objects. The next step includes using the processor to input the acquired set of images into an object detector 125 stored in memory. The object detector step 130 detects a semantic class and a location of at least one object in an image selected from the set of images. For each image, step 131 computes a metric as the combination of an uncertainty of the object detector about the semantic class of the object in the image, and an uncertainty of the object detector about the location of the object in the image. The next step 135 includes using an output interface to display the image for human labeling when the detection metric is above a threshold.

Figure 1B:
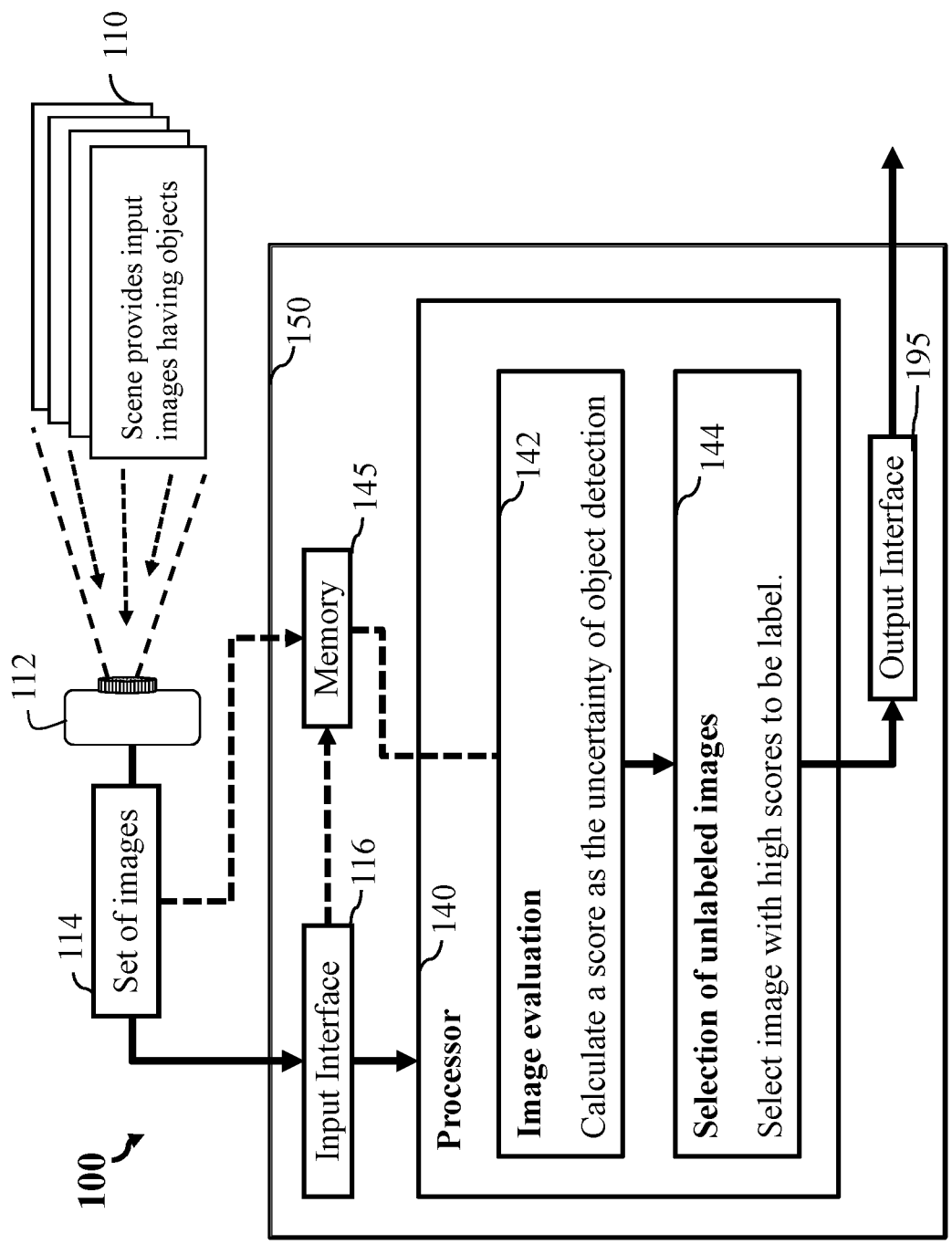
FIG. 1B is a block diagram illustrating the active learning system of FIG. 1A, that further includes some components used for the active learning system, according some embodiments of the present disclosure.

FIG. 1B is a block diagram illustrating the active learning system of FIG. 1A, that further includes some components used for the active learning system, according some embodiments of the present disclosure. The active learning system 100 includes a scene 110 that provides input images obtain by a sensor device 112. For example, the sensor(s) 112 may be a video camera or camera like device, that obtains data from the scene 110 so as to obtain the set of images 114. The data may also include environmental data such as environmental conditions such as temperature, and the like. The input images from the scene 110 include set of images 114 that are obtained by an input interface 116 that is processed by a processor 140. It is contemplated the set of images 114 can be stored in a memory 145 and then later processed by the processor 140. Further, the input interface 116 and the memory 145 may be in communication with a computer 150. Further still, the processor 140 processes the set of images 114 using an object detector 142 that can be stored in the memory 145.

The object detector 142 is processed by the processor(s) 140, such that the object detector 142 can be configured to detect a semantic class and a location of at least one object in an image. For each image, it computes a detection metric based on the classes and locations of the detected object. Step 144 selects image with detection metrics higher than a threshold. Finally, an output interface 195, i.e. display type device, in communication with the processor 145, can be utilized to display the image with the selected images.

Figure 1C:
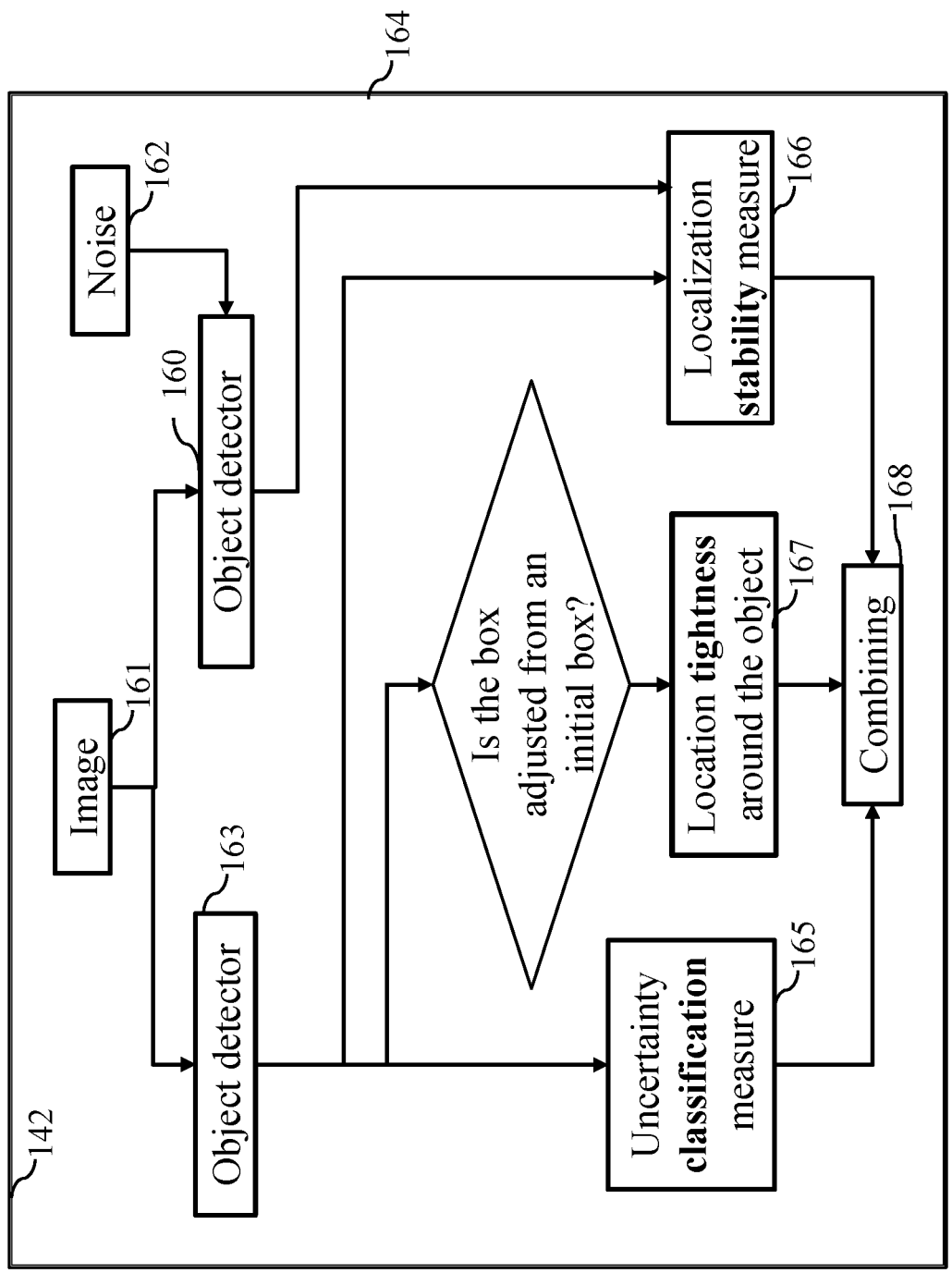
FIG. 1C is a block diagram illustrating the active learning system of FIG. 1A, in particular, the steps taken during object detection step, according some embodiments of the present disclosure.

FIG. 1C is a block diagram illustrating the active learning system of FIG. 1A, in particular, some steps taken during the object detection step 130 of FIG. 1A and object detection step 142 of FIG. 1B, according some embodiments of the present disclosure. Given an image (161), it is first applied to object detector (162) to measure the classification uncertainty (165). If this object detector also contains information about the initial bounding box, block 164 compares the initial bounding box and the final one to measure the tightness (167). To measure the localization stability, we add noise (162) to the image (161) and apply the same object detector (160, which is identical to 163). Step 166 compares the detected boxes generated by detector 163, which is based on the original image, and the detected boxes from detector 1620, which use the same detector algorithm but with noise in the image. Step 166 outputs the localization stability, which is combined with the classification uncertainty from block 165, localization tightness of 167 if exists, to form the final uncertainty measurement for the input image (161).

For example, the object detector can detect the semantic class of the at least one object in the image (classification) based on numerous machine learning algorithms such as convolution neural networks, support vector machine, etc. Given a classification algorithm, it is applied to the image object to calculate the probability of this object to be each of the pre-defined classes. Such that, the uncertainty of the object detector about the semantic class of the object in the image can be a function of these probabilities of all pre-defined classes. For example, the more classes having a high probability, then there is a less certainty of estimating the classified class.

Further, the object detector can detect the location of the at least one object in the image (localization). To detect the objects, multiple boxes of different scales and aspect ratios are generated over the images. For each box, the similarity from image pixels within to pre-collected patterns of objects of interest (e.g. vehicles, pedestrians, trucks, etc.) is measured. The boxes can be further adjusted to fit the pattern as much as possible. As several boxes can overlap the same object, we can further filter the boxes with highest similarity among others that overlap with it. Although the object detector might adjust the initial box to fir the closest and most possible object, the box can be still loose. As a result, the uncertainty of the object detector about the location of the object in the image is a function of a tightness of a bounding box around the object. Wherein the detection metric can be proportional to inconsistency between certainties of the objector detector about the semantic class of the object and the tightness of the location of the object. Further, the function of the tightness of the bounding box around the object can be determined using a ratio of an intersection of an initial bounding box and a final bounding box to a union of the initial bounding box and the final bounding box. It is possible that the object detector can estimate an initial bounding box surrounding the object and adjust the initial bounding box to produce the final bounding box. Further, it is contemplated that the initial bounding box can be proposed by a region proposal network. Wherein the object detector places a plurality of initial bounding boxes at different locations in the image and selects the initial bounding box with a maximal inclusion of an object of a specific semantic class.

We note that the uncertainty of the object detector about the location of the object can be a function of a stability of a bounding box around the object. Wherein the processor can detect the object in the image modified with noise and determines the stability of the bounding box based on a difference between the bounding box determined for the image and the bounding box determined for the image modified with noise. Further, that the detection metric can be a weighted sum of the uncertainty of the neural network about the class of the object in the bounding box and the stability of the bounding box is based on how much its location and size changes with respect to the added noise. If the location and size can be closed under different degree of noise, this bounding box is said to be stable.

According to some embodiments of the present disclosure, an active learning system includes a human machine interface, a storage device including neural networks, a memory, a network interface controller connectable with a network being outside the system. The active learning system further includes an imaging interface connectable with an imaging device, a processor configured to connect to the human machine interface, the storage device, the memory, the network interface controller and the imaging interface, wherein the processor executes instructions for classifying an object in an image using the neural networks stored in the storage device, in which the neural networks perform steps of determining features of a signal using the neuron network, determining an uncertainty measure of the features for classifying the signal, reconstructing the signal from the features using a decoder neuron network to produce a reconstructed signal, comparing the reconstructed signal with the signal to produce a reconstruction error, combining the uncertainty measure with the reconstruction error to produce a rank of the signal for a necessity of a manual labeling, labeling the signal according to the rank to produce the labeled signal, and training the neuron network and the decoder neuron network using the labeled signal.

Figure 2A:
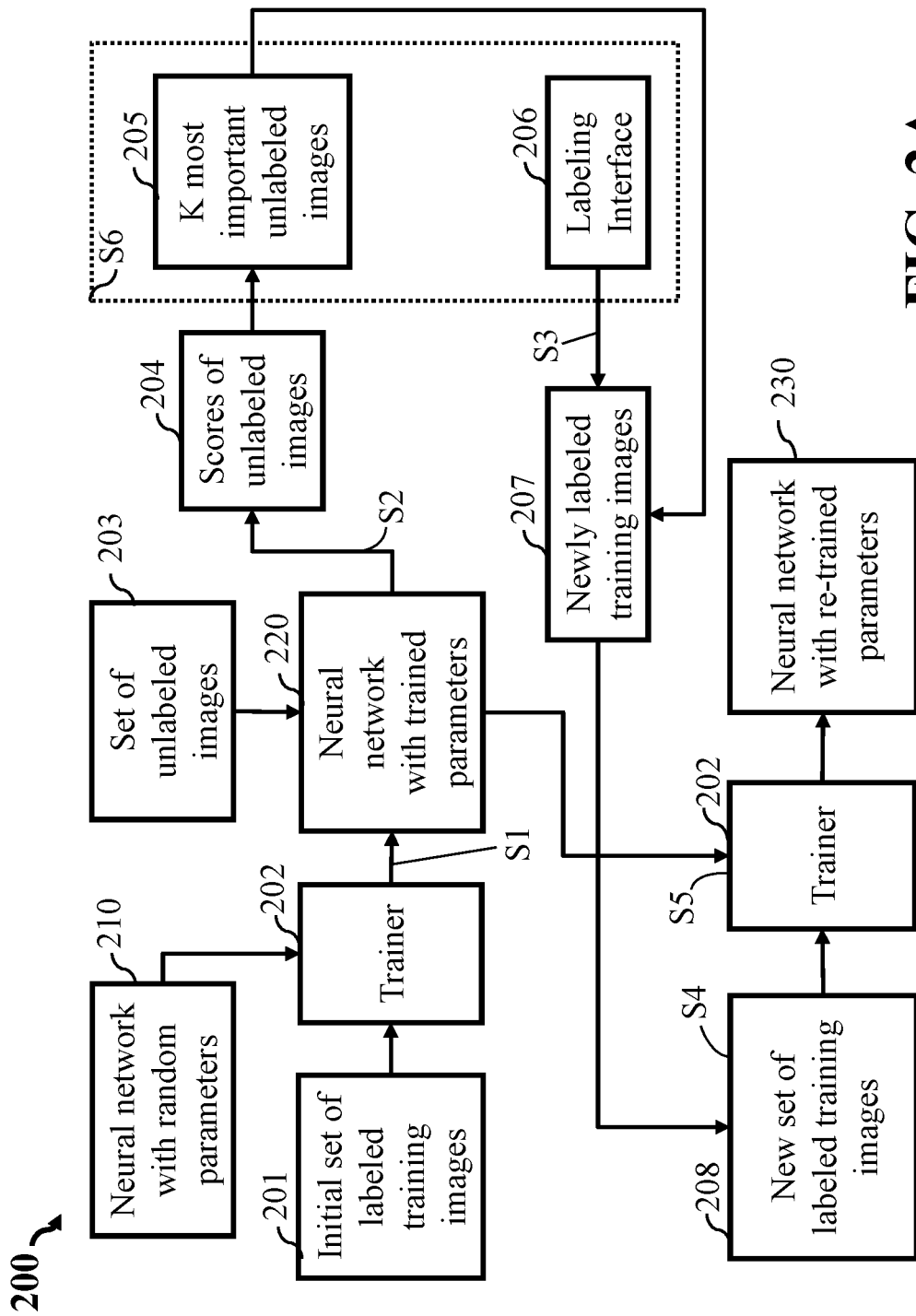
FIG. 2A is a block diagram of the data flow of an active learning system for training a neural network, according some embodiments of the present disclosure.

FIG. 2A is a block diagram of the data flow of an active learning system for training a neural network, according some embodiments of the present disclosure. For example, an initial setting of the active learning system 200 includes a neural network 210 initialized with random parameters, an initial set of labeled training images 201, a trainer 202, a set of unlabeled images 203. In this case, the neural network 210 is a user defined neural network.

The active learning system 200 attempts to efficiently query the unlabeled images for performing annotations through the basic workflow shown in FIG. 2A. Based on the neural network (NN) 210 with randomly initialized parameters, the trainer 202 updates network parameters by fitting the NN 210 to the initial labeled training dataset of images 201. As a result, a trained NN 220 with the updated network parameters is used to rank the importance of images in an unlabeled dataset 203. The unlabeled images 203 are sorted according to importance scores 204 obtained from a ranking result performed by the trained NN 220. The K most important images 205 are stored into a labeling storage in a memory (not shown in FIG. 2A) associated to a labeling interface 206. In response to data inputs made by an operator (or annotator), the labeling interface 206 generates annotated images 207 having the ground truth labels. These annotated images 207 are then added to the initial labeled training dataset 201 to form a new training dataset 208. The trainer 202 then retrains the network 220 by fitting the new training dataset of images 208 and obtains updated neural network parameters 230. This procedure is iterative. The updated neural network parameters 230 are used to rank the importance of the rest of the unlabeled images 203, and the K most important images 205 are sent to the labeling interface 206. Usually, this procedure is repeated several times until a predetermined preferred performance is achieved or the budget for annotations is empty.

Further, still referring to FIG. 2A, the determining features may be performed by using an encoder neural network. In this case, the encoder neural network can perform feature analysis of given signals. In some cases, the signal may be an electroencephalogram (EEG) or an electrocardiogram (ECG). The neural network can use biological signals instead of image signals. Accordingly, some embodiments of the present disclosure can be applied to provide specific signals for assisting a diagnosis of medical doctors.

Figure 2B:
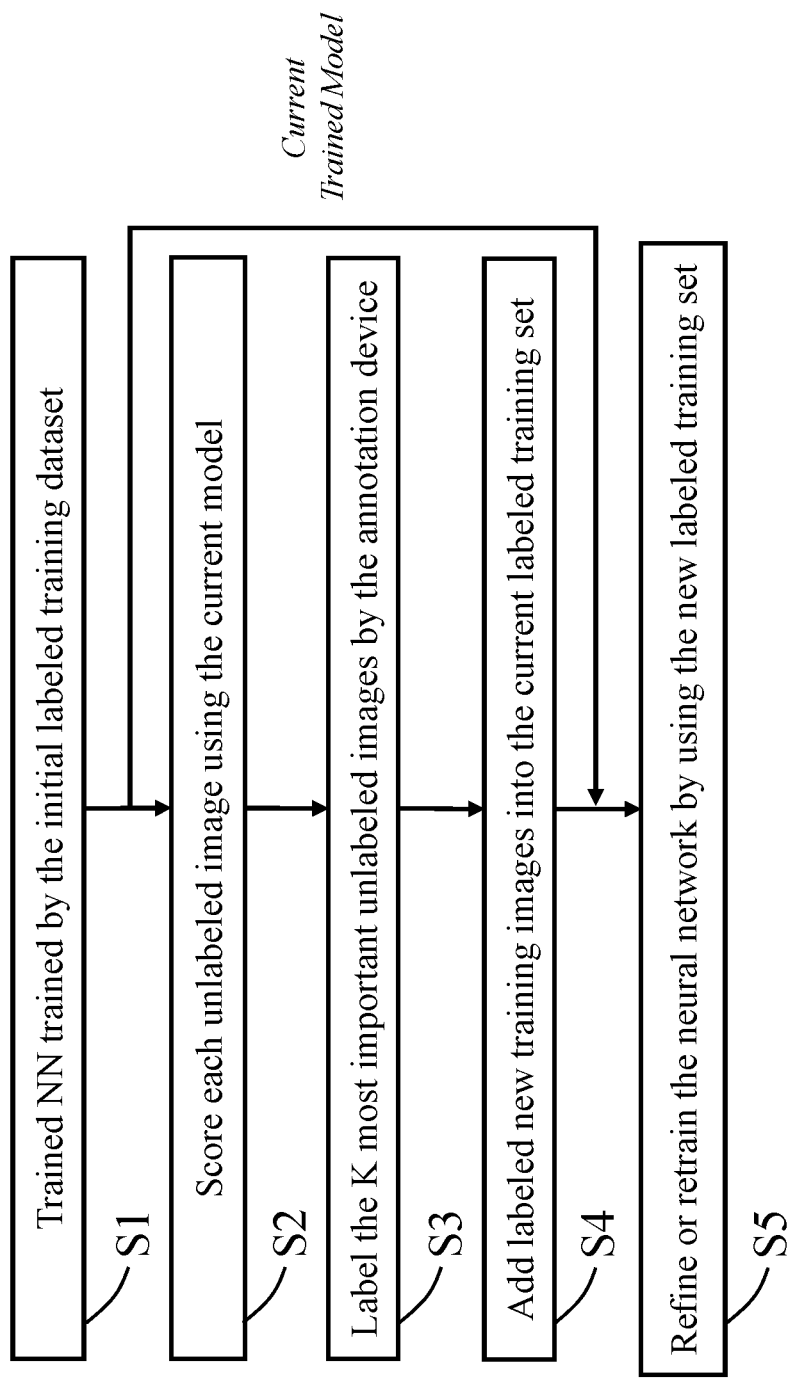
FIG. 2B is a flowchart of an active learning system for training a neural network, according some embodiments of the present disclosure.

FIG. 2B is a flowchart of an active learning system for training a neural network, according some embodiments of the present disclosure. For example, the active learning system 200 attempts to efficiently query the unlabeled images for the annotation through a process flow shown in the figure. The process flow of FIG. 2B can include the following stages:

S1—An initial labeled training dataset is provided and the neural network is trained by using the dataset.

S2—By using the trained NN obtained in step S1, each image in the unlabeled dataset is evaluated and a score would be assigned to each image.

S3—Given the score obtained in step S2, images with the top K highest scores are selected for labeling by the annotation device.

S4—The selected images with newly annotated labels are added into the current (latest) labeled training set to get a new training dataset.

S5—The network is refined or retrained based on the new training dataset.

FIG. 2B shows the active learning algorithms of the active learning system 200 attempt to efficiently query images for labeling images. An initialization model is trained on an initial for small labeled training set. Based on the current model, which is the latest trained model, the active learning system 200 tries to find the most informative unlabeled images to be annotated. A subset of the informative images are labeled and added to the training set for the next round of training. This training process is iteratively performed, and the active learning system 200 carefully adds more labeled images for gradually increasing the accuracy performance of the model on the test dataset. By the very nature, the algorithms of the active learning system 200 usually work much better than the standard approach for training, because the standard approach simply selects the samples at random for labeling.

Although a term "image" is used in the specification, another "signal" can be used in the active learning system 200. For instance, the active learning system 200 may process other signals, such as an electroencephalogram (EEG) or an electrocardiogram (ECG). Instead of the images, the EEG or ECG signals can be trained in the active learning system 200. Then the trained active learning system 200 can be applied to determine or judge abnormality with respect to an input signal, which can be a useful assistance for medical diagnosis of relevant symptoms.

Figure 3:
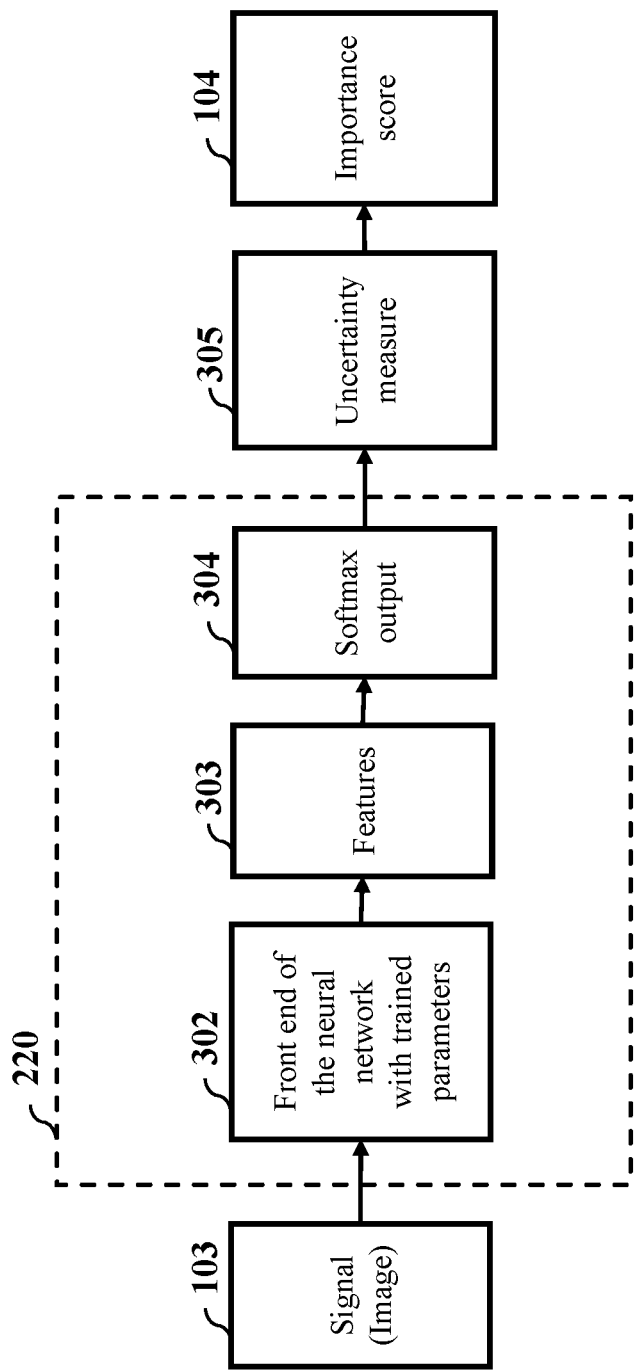
FIG. 3 is a block diagram of an active method for ranking the classification uncertainty and the importance of unlabeled images of FIG. 2A and FIG. 2B, according some embodiments of the present disclosure.

FIG. 3 shows a block diagram of process steps for ranking the importance of unlabeled images in an active learning system of FIG. 2A and FIG. 2B, according to some embodiments of the present disclosure. When an input image from the set of unlabeled images 203 of FIG. 2A, is provided to a front end of the NN 220 of FIG. 2A, in step 302, the trained NN 220 generates features 303 and outputs a classification result via a softmax output layer 304. The classification result is used for calculating the importance score 204 of the input signal through uncertainty measure 305 based on the Rényi entropy.

The trained NN 220 of FIG. 2A is used for extracting the features 303 for each of the images in the unlabeled dataset 203 and also for computing classifications by the softmax output layer 304. The classification result obtained by the softmax output layer 304 is a probability vector of dimension D where the dimension D is the number of object classes. Denoting the input image by x and the classification result computed by the softmax output layer 304 indicating a probability vector by p, each dimension of the probability vector p represents the probability that the input image 203 belongs to a specific class. The sum of the components of p is equal to one. The uncertainty of the class of the input image can then be measured in the step of the uncertain measure 305 by an entropy function H(x). When the entropy H(x) is computed based on the Shannon entropy, the uncertainty of the class of the input image is given by $$H(x) = \Sigma_{i=1}^{D} -p_i \log p_i \quad (1)$$

Still referring to FIG. 3, in an uncertainty method, the uncertainty measure can be used as the importance score of the unlabeled image 204. Further, other entropy measures defined in the Renyi entropy category can be used for the uncertainty computation. For instance, the entropy function H(x) may be Collision entropy, $H(x) = -\log \Sigma_{i=1}^{D} p_i^2$ or Min-entropy, $$H(x) = -\log\max_i p_i.$$

Figure 5:
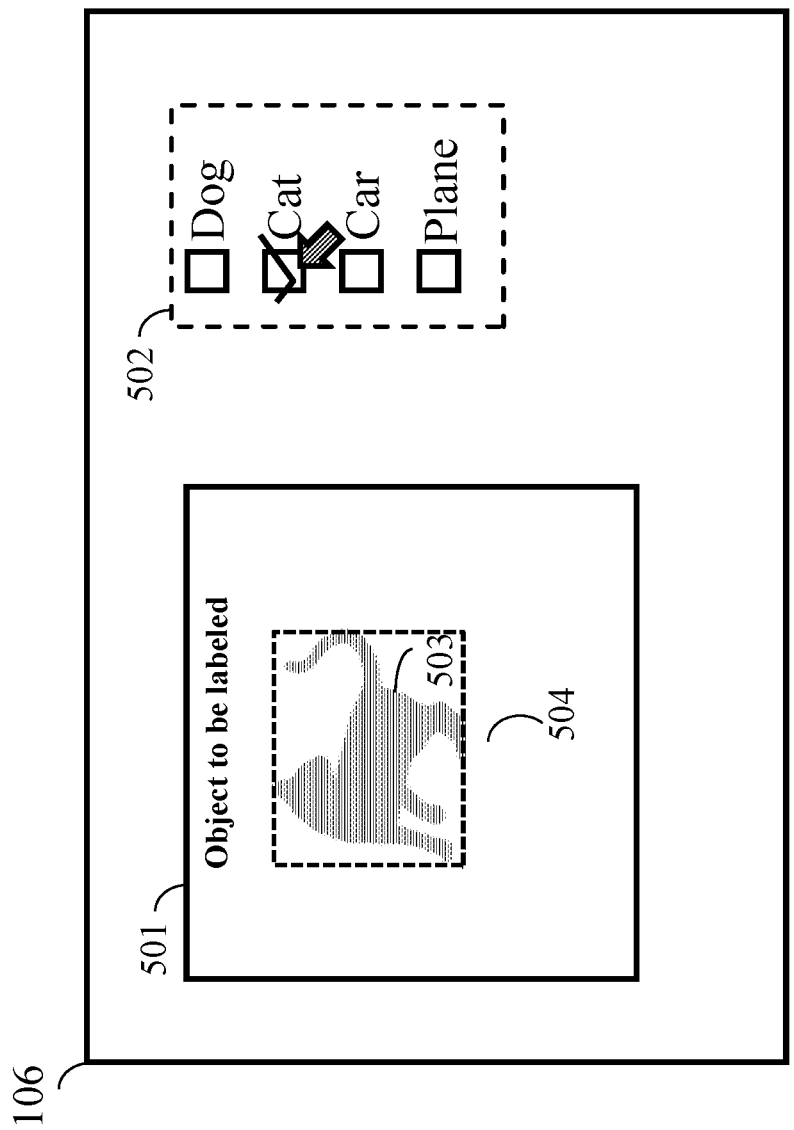
FIG. 5 is a block diagram illustrating the labeling interface according some embodiments of the present disclosure.

Further, entropy based methods may be defined by $$H(x) = 1 - \log\max_i p_i$$

for obtaining an estimate of uncertainty, and an experimental result is shown in FIG. 5.

Still referring to FIG. 3, since the uncertainty method is a universal active learning method, it can be used in conjunction with various classifiers (SVMs, Gaussian processes, or neural networks) as long as the vector representing the class probability can be derived from each input image. In this case, the uncertainty method does not utilize the property of the classifier and reaches sub-optimal performance.

Figure 4:
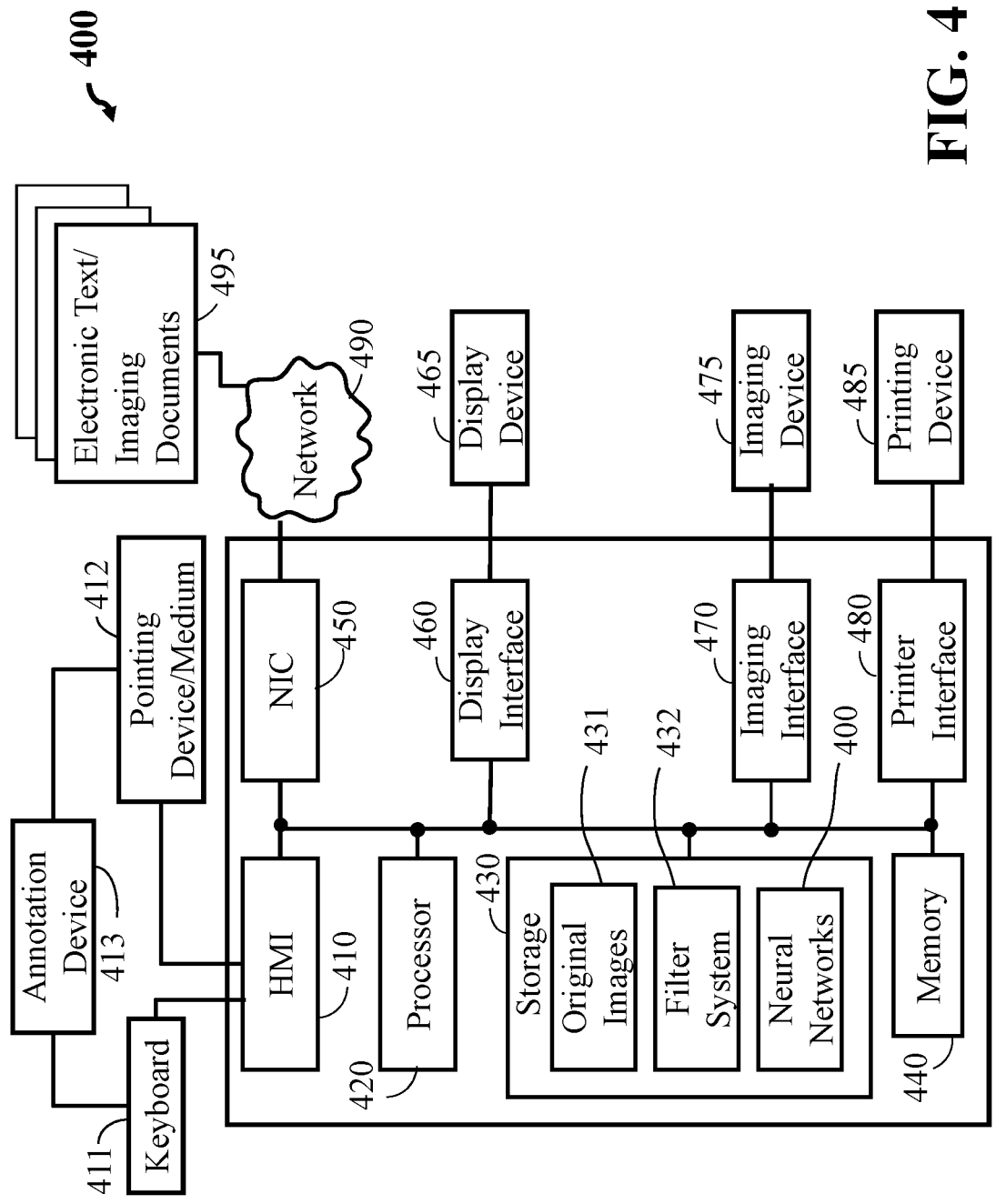
FIG. 4 is a block diagram of an active learning system for annotating the unlabeled images, according some embodiments of the present disclosure.

FIG. 4 shows a block diagram of an active learning system 400 according to some embodiments of the present disclosure. The active learning system 400 can include a human machine interface (HMI) 410 connectable with a keyboard 411 and a pointing device/medium 412, a processor 420, a storage device 430, a memory 440, a network interface controller 450 (NIC) connectable with a network 490 including local area networks and internet network, a display interface 460, an imaging interface 470 connectable with an imaging device 475, a printer interface 480 connectable with a printing device 485. The processor 420 may include one or more than one central processing unit (CPU). The active learning system 400 can receive electric text/imaging documents 495 via the network 490 connected to the NIC 450. The active learning system 400 can receive annotation data from the annotation device 413 via the HMI 410. Further, the annotation device 413 can include a display screen, and the display screen of the annotation device 413 can be configured to display the labeling interface 206 of FIG. 2A that allows the operator to perform labeling process of unlabeled images stored in the memory 440 by showing the unlabeled image in the display region 401 with the selection area 402 having predetermined annotation boxes and predetermined labeling candidates to be selected.

The storage device 430 includes original images 431, a filter system module 432, and a neural network 400. For instance, the processor 420 loads the code of the neural network 400 in the storage 430 to the memory 440 and executes the instructions of the code for implementing the active learning. Further, the pointing device/medium 412 may include modules that read programs stored on a computer readable recording medium.

Referring to FIG. 4 and FIG. 5, FIG. 5 shows an example of the labeling interface 106 of FIG. 2A according to some embodiments of the present disclosure. In FIG. 5, the labeling interface 206 of FIG. 2A includes a display region 501 and a selection area 502. The labeling interface 206 of FIG. 2A can be installed in the annotation device 413 of FIG. 4, which indicates the labeling interface 206 of FIG. 2A on a display of the annotation device 413 of FIG. 4. In some cases, the labeling interface 206 of FIG. 2A can be installed by an input/output interface (not shown in the FIG. 5) connectable to the human machine interface (HMI) 410 of FIG. 4 via the network 490 of FIG. 4. When the labeling interface 206 of FIG. 2A receives an unlabeled image of the K most important unlabeled images 205 in step S6 of FIG. 2A, the labeling interface 206 of FIG. 2A shows the unlabeled image on the display region 501 of FIG. 5. The selection area 502 of FIG. 5 indicates predetermined candidates for labeling the unlabeled image shown on the display region 501. The labeling interface 206 of FIG. 2A allows an operator to assign one of selectable annotations indicated in the selection area 502 with respect to the unlabeled image shown in the display region 501. In FIG. 5, the selection area 502 provides selection boxes with predetermined labeling candidates: Dog, Cat, Car, and Plane. As an example, FIG. 5 shows an unlabeled image indicating a cat image 503 displayed in the display region 501. In this case, the annotation box of Cat is checked by the operator (annotator) in response to the cat image shown in the selection area 502. Besides the categories, the labeler should also draw a bounding box that can tightly around the object. In this example, the box 504 is a tight bounding box to enclose the cat. The labeling interface 206 of FIG. 2A is configured to load and show unlabeled images stored the labeling storage in the memory according to the operations by the operator. The images labeled by the labeling interface 206 of FIG. 2A are stored into a new training image storage area in the memory in step S3 as newly labeled training images 207 as seen in FIG. 2A.

Features

The object detector can detect the location of the at least one object in the image, at least by generating multiple boxes of different scales and aspect ratios over each image for the set of the images. Comparing for each box, pixels within each image in the box to stored patterns of interest of the active learning data in memory, to determine a measurement of similarity for each box of the multiple boxes. Adjusting a location of each box to fit at least one stored pattern of objects, if one or more box overlaps a same stored object pattern. Filtering some of the boxes having the determined similarity measurement amounts above a predetermined overlap threshold from other boxes having the determined measurement similarity amount that overlap.

It is possible the object detector can detect the semantic class of the at least one object in the image at least by comparing for each box, determined patterns within each image in the box to stored image patterns of different semantic classes of the active learning data, to determine a measurement of similarity for each box of the multiple boxes. Wherein the determined patterns within the image in the box is composed of smaller image patterns that are defined image features of different scale/colors/textures in the image selected from the set of images. Normalizing all the classes, based on the determined measured similarities to all classes, such that a sum of the normalized similarity equal 1, and the normalized similarity to each class becomes the class probability.

Further, it is possible that the uncertainty of the object detector about the location of the object in the image can be a function of a tightness of a bounding box around the object. At least one aspect can include the detection metric can be proportional to an inconsistency between certainties of the objector detector about the semantic class of the object and the tightness of the location of the object. At least another aspect can include the function of the tightness of the bounding box around the object is determined using a ratio of an intersection of an initial bounding box and a final bounding box to a union of the initial bounding box and the final bounding box. Wherein the object detector estimates an initial bounding box surrounding the object and adjusts the initial bounding box to produce the final bounding box. Such that, the initial bounding box is specified by users or refined via a region proposal network, and the object detector places a plurality of initial bounding boxes at different locations in the image and selects the initial bounding box with a maximal inclusion of an object of a specific semantic class.

It is contemplated the uncertainty of the object detector about the location of the object can be a function of a stability of a bounding box around the object. Wherein the processor detects the object in the image modified with noise and determines the stability of the bounding box based on a difference between the bounding box determined for the image and the bounding box determined for the image modified with noise. Wherein the detection metric is a weighted sum of the uncertainty of the neural network about the class of the object in the bounding box and the stability of the bounding box is based on how sensitive the bounding box under the noise; if the location and size of an object's bounding box can be close under different degree of noise, this bounding box is stable. Further, the output interface may be a display device.

Contemplated is that the active learning method for object detection uses an object detector that considers both localization and classification of an object in an image. Wherein once the inconsistency, (i.e. the detection metric is proportional to inconsistency between certainties of the objector detector about the semantic class of the object and the tightness of the location of the object), or stability of box, (i.e. the uncertainty of the object detector about the location of the object is a function of a stability of a bounding box around the object, and the processor detects the object in the image modified with noise and determines the stability of the bounding box based on a difference between the bounding box determined for the image and the bounding box determined for the image modified with noise), is computed as the score for each image, we can choose unlabeled image with highest inconsistency or least stability. Such that the chosen images will be sent to human labeler to annotate to select the boxes that contain object and the corresponding class. These images with their labels will be used to train the initial object detector to improve its performance. This process can be repeated till the performance of the object detector is satisfied.

Figure 6:
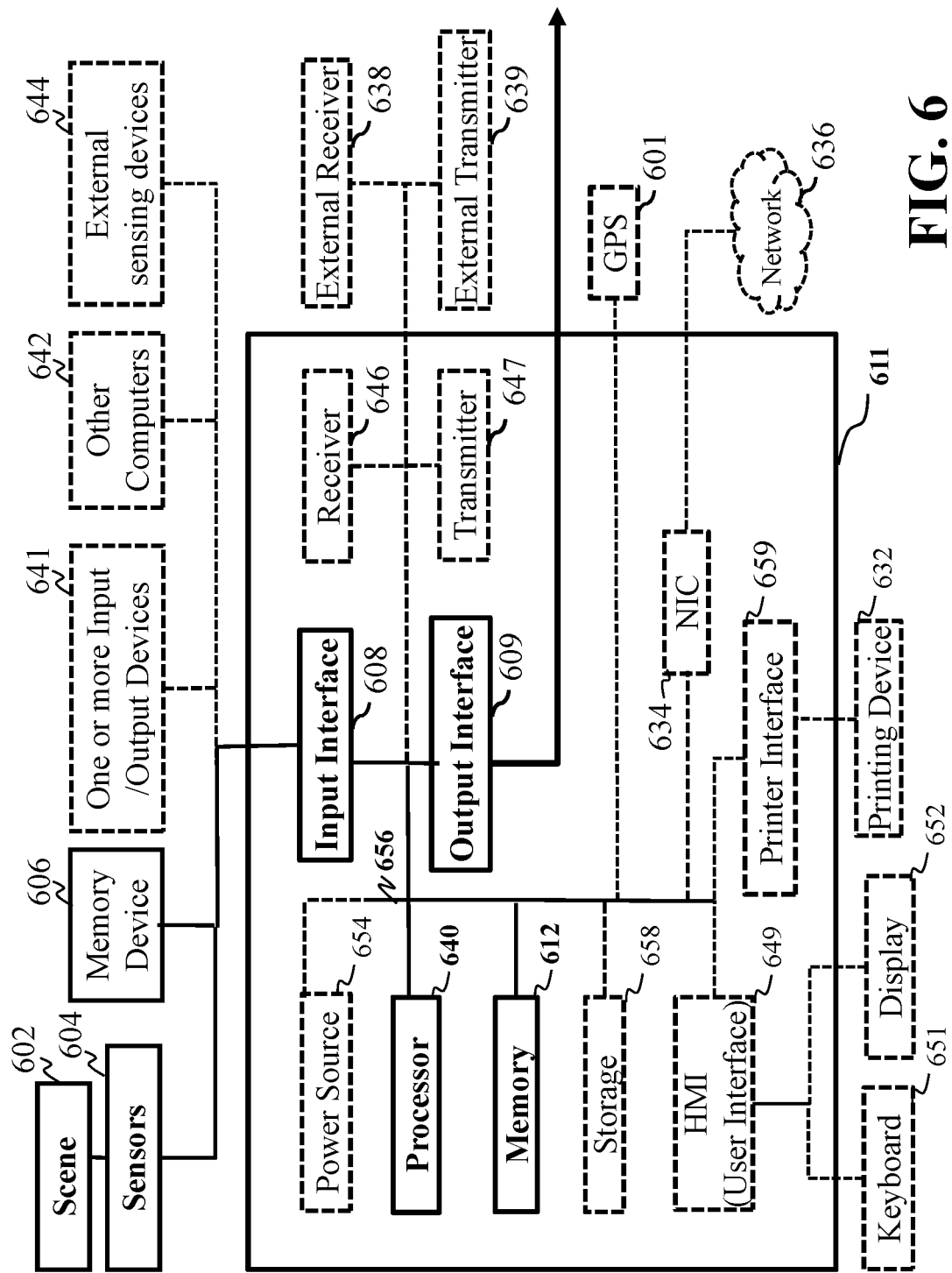
FIG. 6 is a block diagram of illustrating the active learning method of FIG. 1A, that can be implemented using an alternate computer or processor, according to embodiments of the present disclosure.

FIG. 6 is a block diagram of illustrating the method of FIG. 1A, that can be implemented using an alternate computer or processor, according to embodiments of the present disclosure. The computer 611 includes a processor 640, computer readable memory 612, storage 658 and user interface 649 with display 652 and keyboard 651, which are connected through bus 656. For example, the user interface 649 in communication with the processor 640 and the computer readable memory 612, acquires and stores the measuring data in the computer readable memory 612 upon receiving an input from a surface, keyboard surface, of the user interface 657 by a user.

Contemplated is that the memory 612 can store instructions that are executable by the processor, historical data, and any data to that can be utilized by the methods and systems of the present disclosure. The processor 640 can be a single core processor, a multi-core processor, a computing cluster, or any number of other configurations. The processor 640 can be connected through a bus 656 to one or more input and output devices. The memory 612 can include random access memory (RAM), read only memory (ROM), flash memory, or any other suitable memory systems.

Still referring to FIG. 6, a storage device 658 can be adapted to store supplementary data and/or software modules used by the processor. For example, the storage device 658 can store historical device data and other related device data such as manuals for the devices, wherein the devices are sensing device capable of obtaining measured data as mentioned above regarding the present disclosure. Additionally, or alternatively, the storage device 658 can store historical data similar to the measuring data. The storage device 658 can include a hard drive, an optical drive, a thumb-drive, an array of drives, or any combinations thereof.

The system can be linked through the bus 656 optionally to a display interface (not shown) adapted to connect the system to a display device (not shown), wherein the display device can include a computer monitor, camera, television, projector, or mobile device, among others.

The computer 611 can include a power source 654, depending upon the application the power source 654 may be optionally located outside of the computer 611. A printer interface 659 can also be connected through bus 656 and adapted to connect to a printing device 632, wherein the printing device 632 can include a liquid inkjet printer, solid ink printer, large-scale commercial printer, thermal printer, UV printer, or dye-sublimation printer, among others. A network interface controller (NIC) 634 is adapted to connect through the bus 656 to a network 636, wherein measuring data or other data, among other things, can be displayed on a third party display device, third party imaging device, and/or third party printing device outside of the computer 611.

Still referring to FIG. 6, the measuring data or other data, among other things, can be transmitted over a communication channel of the network 636, and/or stored within the storage system 658 for storage and/or further processing. Further, the measuring data or other data may be received wirelessly or hard wired from a receiver 646 (or external receiver 638) or transmitted via a transmitter 647 (or external transmitter 639) wirelessly or hard wired, the receiver 646 and transmitter 647 are both connected through the bus 656. The computer 611 may be connected via an input interface 608 to external sensing devices 644 and external input/output devices 641. The computer 611 may be connected to other external computers 642 and external sensing devices 644. An output interface 609 may be used to output the processed data from the processor 640. Further, the sensors 604 can obtain the set of images from the scene 602.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An active learning system, comprising:
   an input interface to receive a set of images of a scene from a sensor;
   a memory to store active learning data that includes an object detector trained for detecting objects in images;
   a processor in communication with the input interface and the memory, is configured to:
      detect a semantic class and a location of at least one object in an image selected from the set of images using the object detector to produce a detection metric as a combination of an uncertainty of the object detector about the semantic class of the object in the image and an uncertainty of the object detector about the location of the object in the image, wherein the uncertainty for object localization is based on two quantitative measurements of the localization uncertainty, a first quantitative measurement is a Localization Tightness (LT) metric that estimates an amount of how tight detected bounding boxes enclose true objects, and a second quantitative measurement that is a Localization Stability (LS) metric based on whether the detected bounding boxes are sensitive to changes in the input image; and
   an output interface in communication with the processor, to display the image for human labeling when the detection metric is above a threshold.

2. The active learning system of claim 1, wherein the object detector detects the location of the at least one object in the image, by
   generating multiple boxes of different scales and aspect ratios over each image for the set of the images,
   comparing for each box, pixels within each image in the box to stored patterns of objects of interest of the active learning data in memory, to determine a measurement of similarity for each box of the multiple boxes, adjusting a location of each box to fit at least one stored pattern of objects, if one or more box overlaps a same stored object pattern, and filtering some of the boxes having the determined similarity measurement amounts that overlap, based on determining if the determined similarity measurement amount for each box is above a predetermined overlap threshold from other boxes having the determined measurement similarity amount that overlap.

3. The active learning system of claim 2, wherein the object detector detects the semantic class of the at least one object in the image by comparing for each box, determined patterns within each image in the box to stored image patterns of different semantic classes of the active learning data, to determine a measurement of similarity for each box of the multiple boxes, wherein the determined patterns within the image in the box is composed of smaller image patterns that are defined image features of different scale/colors/textures in the image selected from the set of images, and normalizing all the classes, based on the determined measured similarities to all classes, such that a sum of the normalized similarity equal 1, and the normalized similarity to each class becomes the class probability.

4. The active learning system of claim 1, wherein the uncertainty of the object detector about the location of the object in the image is a function of a tightness of a bounding box around the object.

5. The active learning system of claim 4, wherein the detection metric is proportional to an inconsistency between certainties of the objector detector about the semantic class of the object and the tightness of the location of the object.

6. The active learning system of claim 4, wherein the function of the tightness of the bounding box around the object is determined using a ratio of an intersection of an initial bounding box and a final bounding box to a union of the initial bounding box and the final bounding box.

7. The active learning system of claim 6, wherein the object detector estimates an initial bounding box surrounding the object using an algorithm, and adjusts the initial bounding box to produce the final bounding box.

8. The active learning system of claim 7, wherein the initial bounding box is specified by users or refined via a region proposal network.

9. The active learning system of claim 8, the object detector places a plurality of initial bounding boxes at different locations in the image and selects the initial bounding box with a maximal inclusion of an object of a specific semantic class, wherein the specific semantic class is based on the detection metric being above the threshold.

10. The active learning system of claim 1, wherein the uncertainty of the object detector about the location of the object is a function of a stability of a bounding box around the object.

11. The active learning system of claim 10, wherein the processor detects the object in the image modified with noise and determines the stability of the bounding box based on a difference between the bounding box determined for the image and the bounding box determined for the image modified with noise.

12. The active learning system of claim 11, wherein the detection metric is a weighted sum of the uncertainty of the neural network about the class of the object in the bounding box and the stability of the bounding box is based on how sensitive the bounding box under the noise; if the location and size of an object's bounding box can be close under different degree of noise, this bounding box is stable.

13. The active learning system of claim 1, wherein the output interface is a display device.

14. An active learning system, comprising:

a memory receives imaging data that includes sets of images of a scene from a sensor via an input interface, the memory includes a storage device with stored active learning data that includes an object detector trained for detecting objects in images;

an output interface; and a processor configured to connect to the memory, the input interface and the output interface, wherein the processor executes instructions for producing a detection metric using the object detector, wherein the object detector perform the steps of:

detecting a semantic class and a location of at least one object in an image selected from at least one set of images of the sets of images using the object detector to produce a detection metric as a combination of an uncertainty of the object detector about the semantic class of the object in the image and an uncertainty of the object detector about the location of the object in the image, wherein the uncertainty for object localization is based on two quantitative measurements of the localization uncertainty, a first quantitative measurement is a Localization Tightness (LT) metric that estimates an amount of how tight detected bounding boxes enclose true objects, and a second quantitative measurement that is a Localization Stability (LS) metric based on whether the detected bounding boxes are sensitive to changes in the input image;

outputting the image using the output interface to an imaging interface connected to an imaging device, for displaying the image on the imaging device for human labeling when the detection metric is above a threshold.

15. The active learning system of claim 14, wherein the uncertainty of the object detector about the location of the object in the image is a function of a tightness of a bounding box around the object.

16. The active learning system of claim 15, wherein the detection metric is proportional to inconsistency between certainties of the objector detector about the semantic class of the object and the tightness of the location of the object.

17. The active learning system of claim 16, wherein the function of the tightness of the bounding box around the object is determined using a ratio of an intersection of an initial bounding box and a final bounding box to a union of the initial bounding box and the final bounding box.

18. The active learning system of claim 17, wherein the object detector estimates an initial bounding box surrounding the object and adjusts the initial bounding box to produce the final bounding box.

19. An active learning method for object detection using an object detector that considers both localization and classification of an object in an image, comprising:

receiving imaging data that includes sets of images of a scene from a sensor via an input interface and storing the imaging data in a memory, wherein the memory includes a storage device having stored active learning data that includes an object detector trained for detecting objects in images;

using a processor in communication with the input interface and the memory, the processor is configured for executing instructions for producing a detection metric using the object detector, wherein the object detector performs the steps of detecting a semantic class and a location of at least one object in an image selected from at least one set of images of the sets of images using the object detector to produce a detection metric as a combination of an uncertainty of the object detector about the semantic class of the object in the image and an uncertainty of the object detector about the location of the object in the image, wherein the at least one object is detected in an image modified with noise, and wherein the uncertainty for object localization is based on two quantitative measurements of the localization uncertainty, a first quantitative measurement is a Localization Tightness (LT) metric that estimates an amount of how tight detected bounding boxes enclose true objects, and a second quantitative measurement that is a Localization Stability (LS) metric based on whether the detected bounding boxes are sensitive to changes in the input image; and outputting the image via an output interface to an imaging device, to display the image for human labeling when the detection metric is above a threshold, wherein the processor is in communication with the output interface and imaging device.

20. The active learning method of claim 19, wherein the uncertainty of the object detector about the location of the object in the image is a function of a tightness of a bounding box around the object, wherein the detection metric is proportional to an inconsistency between certainties of the objector detector about the semantic class of the object and the tightness of the location of the object, or wherein the function of the tightness of the bounding box around the object is determined using a ratio of an intersection of an initial bounding box and a final bounding box to a union of the initial bounding box and the final bounding box, and wherein the object detector estimates an initial bounding box surrounding the object and adjusts the initial bounding box to produce the final bounding box, such that the initial bounding box is specified by users or refined via a region proposal network.

21. The active learning system of claim 1, wherein the LT metric is estimated based on an amount of adaptation of an initial bounding box via a region proposal network (RPN) by the object detector.

* * * * *